(12) United States Patent
Schustek

(10) Patent No.: US 8,742,642 B2
(45) Date of Patent: Jun. 3, 2014

(54) ELECTRIC MOTOR WITH PERMANENT MAGNET EXCITATION

(75) Inventor: Siegfried Schustek, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 13/387,457

(22) PCT Filed: Jul. 16, 2010

(86) PCT No.: PCT/EP2010/060353
§ 371 (c)(1),
(2), (4) Date: Apr. 10, 2012

(87) PCT Pub. No.: WO2011/012472
PCT Pub. Date: Feb. 3, 2011

(65) Prior Publication Data
US 2012/0187790 A1   Jul. 26, 2012

(30) Foreign Application Priority Data

Jul. 27, 2009  (DE) .................. 10 2009 028 036

(51) Int. Cl.
*H02K 1/08* (2006.01)
(52) U.S. Cl.
USPC ............. 310/154.15; 310/154.18; 310/154.27
(58) Field of Classification Search
USPC ............. 310/154.03, 154.08, 154.09, 154.11, 310/154.15, 154.17–154.19, 154.27, 310/154.35, 154.36, 154.42, 154.48
See application file for complete search history.

(56) References Cited

U.S. PATENT DOCUMENTS

| | | | |
|---|---|---|---|
| 3,988,623 A | | 10/1976 | Yamaguchi et al. |
| 4,580,072 A | * | 4/1986 | Morishita ............... 310/154.15 |
| 4,587,449 A | | 5/1986 | West |
| 4,748,358 A | | 5/1988 | Ruhle et al. |
| 4,827,173 A | | 5/1989 | Corbach et al. |
| 4,899,074 A | | 2/1990 | West |
| 5,201,111 A | * | 4/1993 | Prohaska ..................... 29/596 |
| 6,181,035 B1 | * | 1/2001 | Acquaviva ................... 310/51 |
| 6,359,363 B1 | | 3/2002 | Foerstera et al. |

FOREIGN PATENT DOCUMENTS

| | | |
|---|---|---|
| EP | 2073344 | 6/2009 |
| FR | 2625852 | 7/1989 |
| GB | 2130810 | 6/1984 |
| JP | 53019720 | 2/1978 |
| JP | 59002554 | 1/1984 |
| JP | 59053073 | 3/1984 |
| JP | 60102858 | 6/1985 |
| JP | 63023546 | 1/1988 |
| JP | 63117647 | 5/1988 |
| JP | 07023667 | 1/1995 |
| JP | 9084315 | 3/1997 |
| JP | 9168245 | 6/1997 |
| JP | 2007097245 | 4/2007 |

OTHER PUBLICATIONS

PCT/EP2010/060353 International Search Report dated Nov. 28, 2011 (3 pages).

* cited by examiner

*Primary Examiner* — Dang Le
(74) *Attorney, Agent, or Firm* — Michael Best & Friedrich LLP

(57) ABSTRACT

An electric motor with a permanent magnet excitation comprises permanent magnets retained in a pole housing and associated with the flux-conducting element, wherein at least one permanent magnet and a flux-conducting element are arranged so that they are in positively interlocking engagement.

15 Claims, 4 Drawing Sheets

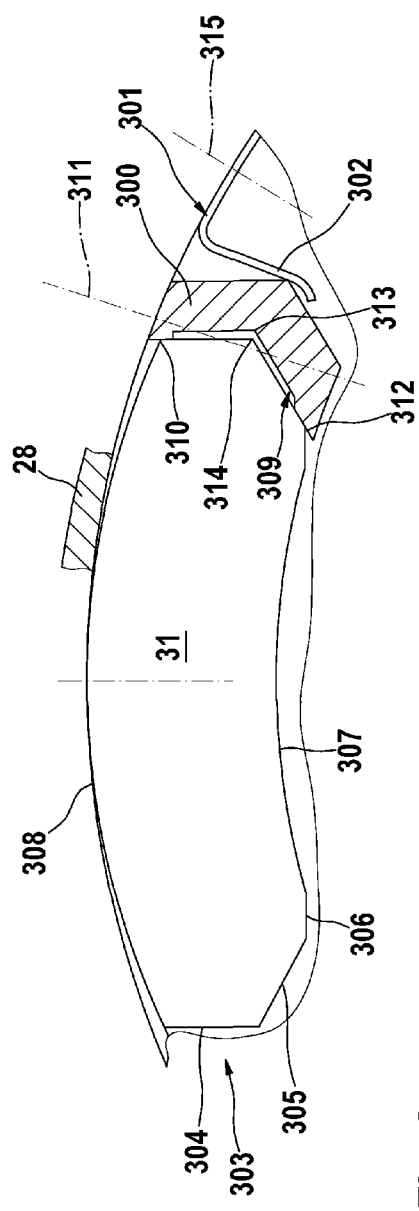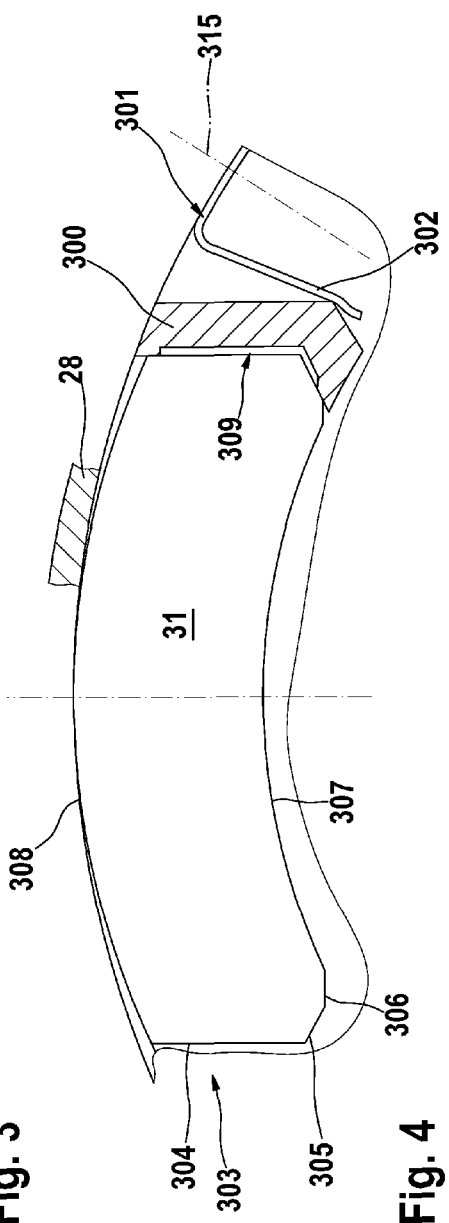

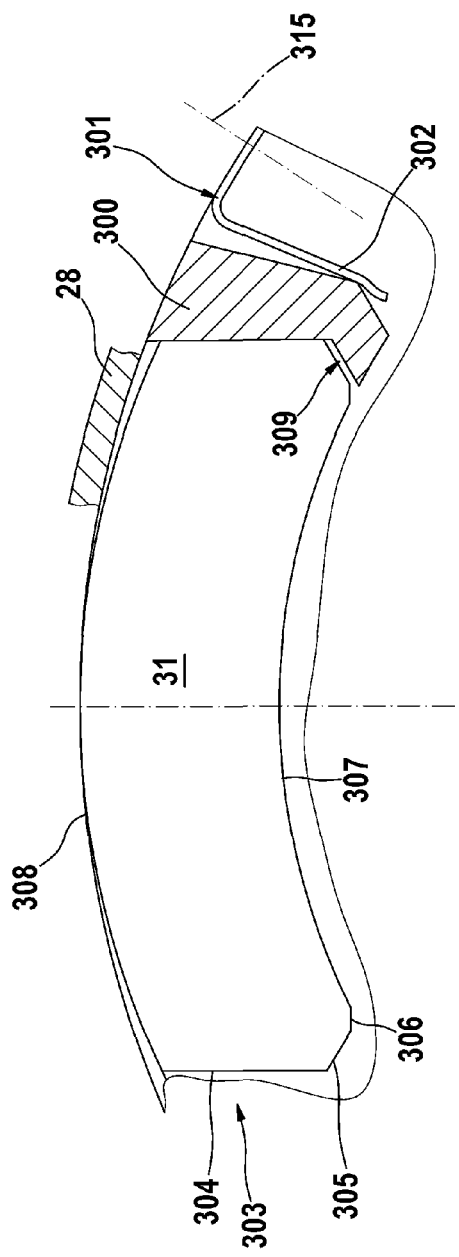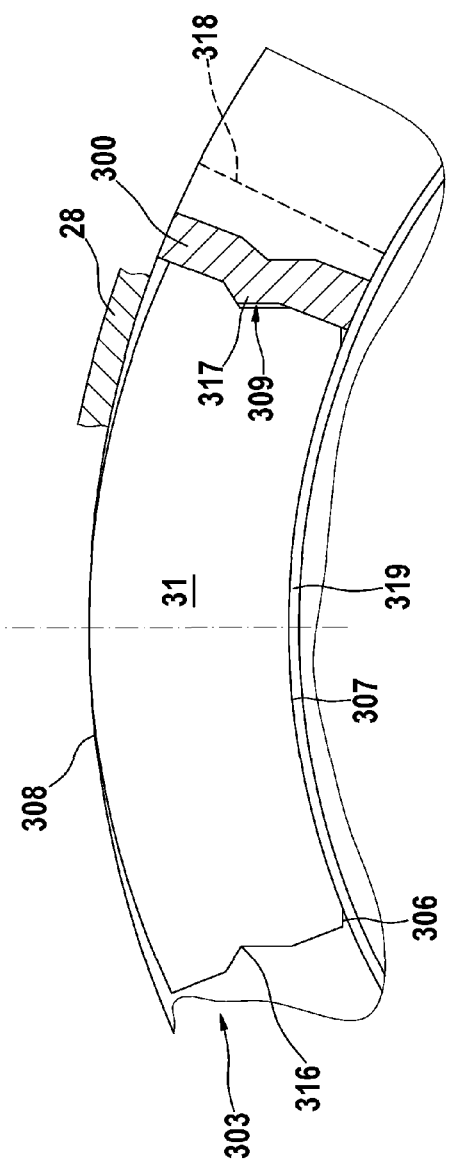

ELECTRIC MOTOR WITH PERMANENT MAGNET EXCITATION

BACKGROUND OF THE INVENTION

The invention relates to an electric motor with permanent magnet excitation.

DE 35 39 851 A1 has disclosed an electric starter motor for an internal combustion engine, said starter motor having permanent magnets on the pole housing which surround an armature shaft with an armature arranged thereon. The permanent magnets are fixed in the housing with the aid of holding springs, which are arranged between adjacent magnets and have spring arms bearing against one end side of the magnets in a resilient manner. In order to achieve a series characteristic, in which high torques are emitted even at low rotation speeds, flux guidance pieces are associated with the permanent magnets, said flux guidance pieces consisting of a material with good magnetic conductivity and serving to guide the magnetic flux. In accordance with DE 35 39 851 A1, the holding springs are additionally fastened on the housing with a rivet in order to be able to absorb the radial forces acting on the flux guidance pieces and to hold the magnets including the flux guidance pieces in the housing in the desired position.

In accordance with a further embodiment described in DE 35 39 851 A1, the permanent magnets including the flux guidance pieces are positioned on the pole housing with the aid of holding rings, which secure the permanent magnets and the flux guidance pieces radially with respect to the surrounding pole housing. Spring tongues which protrude out of the holding rings through 90° place the flux guidance pieces against the magnets in the circumferential direction. Both the holding via riveted-in holding springs and via the holding rings or in the form of welded-in or riveted flux guidance pieces with simple holding springs represent comparatively complex embodiments.

SUMMARY OF THE INVENTION

The invention is based on the object of forming an electric motor with permanent magnet excitation using simple design measures in such a way that the magnets, without any complex subsequent processing, for example, by grinding, and the flux guidance elements are held securely on the pole housing.

The invention is based on an electric motor with permanent magnet excitation, said electric motor being used for example as a starter motor for an internal combustion engine. The electric motor is in particular in the form of an internal-rotor motor, whose stator surrounds an armature shaft with an armature. The stator comprises a pole housing, with the permanent magnets and the flux guidance elements being fixed to the inner side of said pole housing with the aid of fastening means.

The invention provides that at least one permanent magnet and at least one associated flux guidance element are arranged so as to engage in one another in a form-fitting manner, the form-fitting connection being provided in the radial direction and preferably also in the circumferential direction. This is realized, for example, by means of a projection, which extends in the circumferential direction, which is arranged on one of the component parts and which protrudes into a complementarily shaped cutout in the other component part. In this case, both the embodiments in which the projection is arranged on a side face of the permanent magnet and the cutout is introduced into the facing side face of the flux guidance piece and reverse embodiments with a projection on the flux guidance element and a cutout in the permanent magnet are possible. In both cases, which may also be combined with one another, if appropriate, the projection and the cutout extend in the circumferential direction, with the result that a recess between the mutually engaging sections and therefore a form-fitting connection is provided in the radial direction. The side faces on which the projection or in which the cutout is formed delimit the respective component part in the circumferential direction.

Owing to the form-fitting connection, it is in principle sufficient for only one of the component parts, i.e. either the permanent magnet or the flux guidance element, to be fixed on the pole housing with the aid of the fastening means. The holding force is also transmitted, via the form-fitting connection, to the component part, on which the fastening means does not directly act, and secures said component part in the position on the inner side of the pole housing. It is therefore in principle not necessary for the component part which is not directly in contact with the fastening means to be secured via a further fastening means or for both component parts to be held directly in position by the same fastening means; although these variants are also possible.

A further advantage of the embodiment according to the invention can be considered to be one in which the side faces of the permanent magnets do not need to be subjected to any processing or only need to be subjected to less processing than is required in the prior art. In principle, it is sufficient to incorporate the magnets directly into the electric motor after production of said magnets without any processing of the lateral limiting faces, in particular without any grinding operations, since side faces on the magnets which are parallel by virtue of the production can also be used owing to the form-fitting engagement of the flux guidance element behind said magnet. The magnets provided after pressing with parallel side faces on the magnets can be inserted directly into the pole housing in this form.

If appropriate, the side faces are subjected to processing, but this may be less involved in comparison with embodiments from the prior art. For example, it may be sufficient to subject the side faces to partial grinding only over part of their radial extent, with the result that an angled lateral limiting face on the permanent magnet is produced. Owing to the angular alignment of the partially ground partial face, it is possible for the flux guidance element to engage in a form-fitting manner behind this, without it requiring any additional installation space when the permanent magnet and the flux guidance element engage in one another.

In addition to the form-fitted securing arrangement, the arched effect for holding the permanent magnets on the inner side of the pole housing is used by virtue of the permanent magnets being supported on the two opposite side faces, with a flux guidance element being arranged on one side. Since the flux guidance elements are subjected to increased forces acting radially inwards when the starter motor is switched on, improved mutual support to counteract radial shifting in the direction of the armature shaft is achieved via the form-fitting connection between the flux guidance element and the adjoining permanent magnet.

In accordance with an expedient embodiment, a gap is provided in the region of the contact surface between the flux guidance element and the permanent magnet, said gap extending in the radial direction at least over a subregion of the mutually facing side faces. The gap serves to compensate for manufacturing tolerances of the magnet and/or the flux guidance element, with the result that it is possible to dispense with grinding processing, in particular in the production of the magnet. In addition, the gap reduces the magnetic short circuit through the flux guidance element.

In accordance with a further expedient embodiment, the mutually facing side faces of the permanent magnet and the associated flux guidance element are provided with a geometry in which a radially outer edge of the permanent magnet, on the one hand, and an edge which is positioned further radially inwards of the flux guidance element, on the other hand, lie on different sides with respect to a radial which is passed through the contact region. This means that, given a planar embodiment, the contact face between the permanent magnet and the flux guidance element is at an angle with respect to the radial, which ensures a sufficient form-fitting connection. In this case, both embodiments in which the radially outer edge of the permanent magnet extends further in the circumferential direction than the radially inner edge of the permanent magnet and embodiments in which the radially outer edge extends less far in the circumferential direction than the radially inner edge on the same side face, wherein the facing side face of the flux guidance element has in each case a complementary cross-sectional geometry, are possible. Furthermore, angular side face geometries with two partial faces arranged at an angle with respect to one another both on the part of the permanent magnet and on the part of the flux guidance element are also possible.

In accordance with yet a further embodiment, in principle there is also the possibility of a contact face which extends in the radial direction, in which case the form-fitting connection is ensured via at least one projection extending in the circumferential direction on one of the component parts and via a correspondingly shaped cutout in the other component part.

In accordance with yet a further embodiment, the fastening means for holding the permanent magnet and the associated flux guidance element on the inner side of the pole housing is in the form of a holding spring, which, by virtue of the arched effect, bears against the pole housing and is held in position in the pole housing via tabs, for example. The holding spring preferably has a U shape, with a limb pressing against the flux guidance element or against the permanent magnet in the circumferential direction. The holding spring is associated with precisely one magnet/flux guidance element combination, wherein an embodiment of the holding spring in which two adjacent permanent magnets including flux guidance elements are secured via a common spring is also optionally possible. A limb of the holding spring presses against the flux guidance element or the permanent magnet either in punctiform fashion, in linear fashion or areally.

In principle, an embodiment of the fastening means in the form of end-side holding rings with an integrally formed collar which hold the flux guidance element and/or the permanent magnet in position radially with respect to the pole housing is also possible.

In accordance with yet a further expedient embodiment, provision is made for the flux guidance element to have a constant cross section, when viewed in the radial direction, apart from its base geometry, which may have a cross-sectional area which is in the form of a rectangle, in the form of a partial circle or with an annular form, for example. However, it is also possible to use flux guidance elements which have a varying cross section in the radial direction, in particular a cross section which increases in size from the inside outwards radially.

The flux guidance elements are preferably in the form of a sheet-metal part, a bent part, a stamped part or an extruded part.

BRIEF DESCRIPTION OF THE DRAWINGS

Further advantages and expedient embodiments can be gleaned from the remaining claims, the description relating to the figures and drawings, in which:

FIG. 3 shows an enlarged illustration of a view of a permanent magnet with a laterally adjoining flux guidance element, which has an angled form, FIG. 4 shows a further exemplary embodiment, in which the two limbs of the angular flux guidance element are asymmetrical, FIG. 5 shows a further exemplary embodiment in which the flux guidance element has a varying cross section in the radial direction, FIG. 6 shows a further exemplary embodiment, in which a projection which extends in the circumferential direction on the flux guidance element protrudes into an associated cutout in the side face of the permanent magnet.

DETAILED DESCRIPTION

In the figures, identical component parts have been provided with the same reference symbols.

Figure 1:
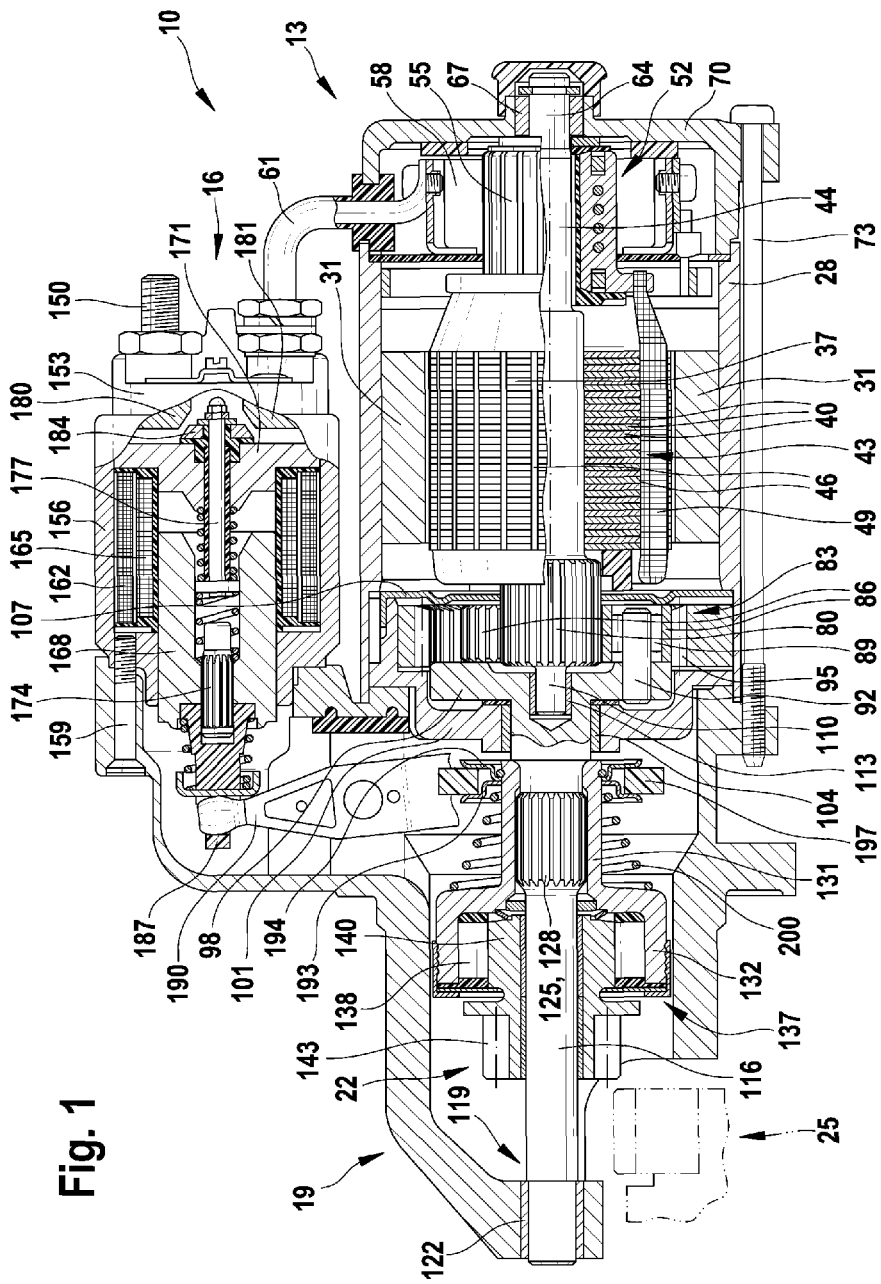
FIG. 1 shows a starting apparatus for an internal combustion engine in a longitudinal section.

FIG. 1 shows a starting apparatus 10 in a longitudinal section. This starting apparatus 10 has, for example, a starter motor 13 and a starter relay 16. The starter motor 13 and the starter relay 16 are fastened on a common input drive end frame 19. The starter motor 13 has the functional purpose of driving a starter pinion 22 when it is engaged in the ring gear 25 of the internal combustion engine (not illustrated here).

The starter motor 13 is in the form of an electric motor with permanent excitation and has, as housing, a pole tube 28, which bears permanent magnets 31 on its inner circumference, said permanent magnets each having associated flux guidance elements. The permanent magnets 31 in turn surround an armature 37, which has an armature stack 43 comprising laminations 40 and an armature winding 49 arranged in slots 46. The armature stack 43 is pressed onto an armature or input drive shaft 44. Furthermore, a commutator 52, which comprises, inter alia, individual commutator segments 55, is fitted to that end of the drive shaft 44 which is remote from the starter pinion 22. The commutator segments 55 are electrically connected to the armature winding 49 in a known manner in such a way that, when the commutator segments 55 are energized by carbon brushes 58, a rotary movement of the armature 37 in the pole tube 28 results. A power supply line 61 arranged between the starter relay 16 and the starter motor 13 supplies current to the carbon brushes 58 in the switched-on state. The input drive shaft 44 is supported on the commutator side by a shaft journal 64 in a sliding bearing 67, said sliding bearing in turn being held fixed in position in a commutator bearing cap 70. The commutator cap 70 is in turn fastened in the input drive end frame 19 by means of tension rods 73, which are arranged distributed over the circumference of the pole tube 28 (screws, for example 2, 3 or 4 pieces). In the process, the pole tube 28 is supported on the input drive end frame 19, and the commutator bearing cap 70 is supported on the pole tube 28.

In the output drive direction, the armature 37 is adjoined by a so-called sun gear 80 which is part of a planetary gear mechanism 83. The sun gear 80 is surrounded by a plurality of planet gears 86, usually three planet gears 86, which are supported by means of a roller bearings 89 on axial journals

92. The planet gears 86 roll in a hollow wheel 95, which is mounted externally in the pole tube 28. In the direction towards the output drive side, the planet gears 86 are adjoined by a planet carrier 98, in which the axial journals 92 are accommodated. The planet carrier 98 is in turn mounted in an intermediate bearing 101 and a sliding bearing 104 arranged therein. The intermediate bearing 101 is configured in the form of a pot in such a way that both the planet carrier 98 and the planet gears 86 are accommodated in said intermediate bearing. Furthermore, the hollow wheel 95 is arranged in the pot-shaped intermediate bearing 101 and is ultimately closed by a cover 107 with respect to the armature 37. The intermediate bearing 101 is also supported with its outer circumference on the inner side of the pole tube 28. The armature 37 has a further shaft journal 110 on that end of the input drive shaft 44 which is remote from the commutator 52, said shaft journal likewise being accommodated in a sliding bearing 113. The sliding bearing 113 is in turn accommodated in a central bore in the planet carrier 98. The planet carrier 98 is integrally connected to the output drive shaft 116. This output drive shaft 116 is supported with its end 119 remote from the intermediate bearing 101 in a further bearing 122, which is fastened in the input drive end frame 19. The output drive shaft 116 is divided into various sections: a section with a so-called straight gearing 125 (inner gearing) which is part of a so-called shaft-hub connection thus follows the section arranged in the sliding bearing 104 of the intermediate bearing 101. This shaft-hub connection 128 makes it possible in this case for a driver 131 to perform an axially linear sliding movement. This driver 131 is a sleeve-like protrusion, which is integral with a pot-shaped outer ring 132 of the freewheel 137. This freewheel 137 (ratchet) furthermore comprises the inner ring 140, which is arranged radially within the outer ring 132. Clamping bodies 138 are arranged between the inner ring 140 and the outer ring 132. These clamping bodies 138, in interaction with the inner ring and the keyways of the outer ring, prevent a relative rotation between the outer ring and the inner ring in a second direction. In other words: the freewheel 137 provides the possibility of a relative movement between the inner ring 140 and the outer ring 132 only in one direction. In this exemplary embodiment, the inner ring 140 is integral with the starter pinion 22 and the helical gearing 143 (outer helical gearing) thereof.

For reasons of completeness, details are also given here on the meshing mechanism. The starter relay 16 has a pin 150, which is an electrical contact and which is connected to the positive terminal of an electrical starter battery (not illustrated here). This pin 150 is passed through a relay cover 153. This relay cover 153 seals off a relay housing 156, which is fastened to the input drive end frame 19 by means of a plurality of fastening elements 159 (screws). Furthermore, a pull-in winding 162 and a so-called hold-in widening 165 are arranged in the starter relay 16. The pull-in winding 162 and the hold-in winding 165 both each induce an electromagnetic field in the switched-on state, said electromagnetic field flowing both through the relay housing 156 (consisting of an electromagnetically conductive material), a linearly movable armature 168 and an armature magnetic return path 171. The armature 168 bears a push rod 174, which is moved in the direction toward a switching pin 177 during linear pull-in of the armature 168. With this movement of the push rod 174 toward the switching pin 177, said switching pin is moved out of its rest position in the direction toward two contacts 180 and 181, with the result that a contact link 184, which is fitted at that end of the switching pin 177 which faces the contacts 180 and 181, electrically connects the two contacts 180 and 181 to one another. As a result, electric power is passed from the pin 150 beyond the contact link 184, to the power supply line 61 and therefore to the carbon brushes 58. The starter motor 13 is energized in the process. However, furthermore, the starter relay 16 and the armature 168 also have the object of moving, with a pull element 187, a lever which is arranged in rotationally movable fashion on the input drive end frame 19. This lever 190, usually in the form of a forked lever, engages with two "prongs" (not shown here) on its outer circumference around two disks 193 and 194 in order to move a driver ring 197 which is trapped between said disks towards the freewheel 137 counter to the resistance of the spring 200 and thereby to mesh the starter pinion 22 in the ring gear 25.

Figure 2:
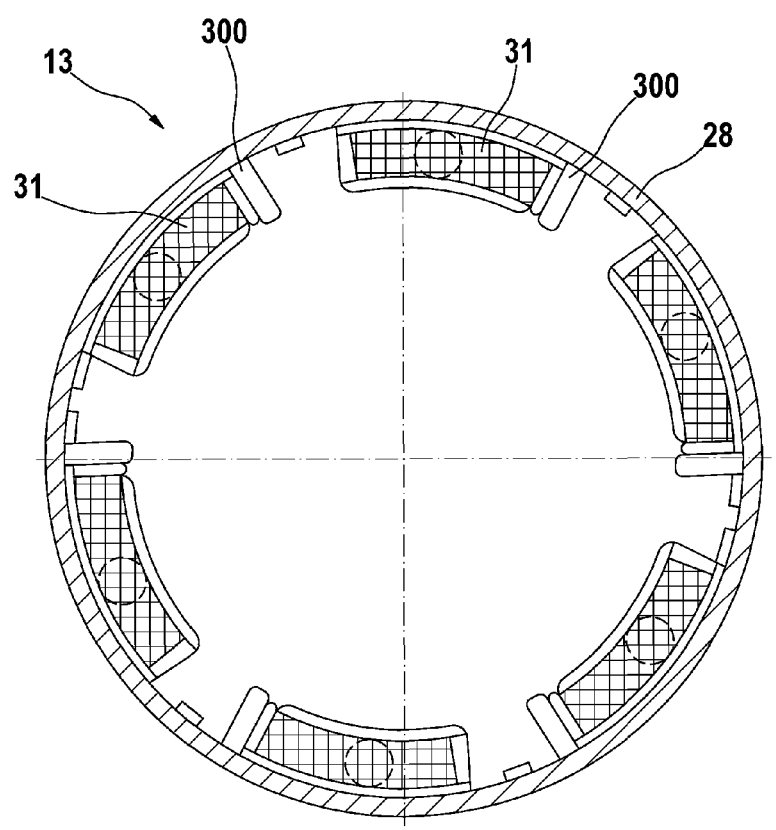
FIG. 2 shows the electric motor of the starting apparatus in section transversely to the longitudinal axis.

The stator 13 of the starter motor in the form of an electric motor is illustrated in section in FIG. 2. A plurality of permanent magnets 31 are arranged distributed over the circumference on the inner side of the cylindrical pole housing 28, with in each case one flux guidance element 300, directly adjoining in a circumferential direction, being associated with each permanent magnet 31, said flux guidance element consisting of a material with good magnetic conductivity. The flux guidance element 300 is in contact with the associated permanent magnet 31; a small air gap produced during manufacture may be located between the facing side faces of the permanent magnet 31 and the flux guidance element 300.

FIG. 3 shows the form-fitting connection between a permanent magnet 31 on the inner side of the pole housing 28 and the associated flux guidance element 300. The permanent magnet 31 has a mirror-symmetrical configuration with respect to a magnet central plane and has cross-sectional configuration in the form of a partial circle, the radial outer side 308 bearing directly against the inner wall of the pole housing 28 and the radial inner side 307 having a small radial distance from the armature. The side faces 303 limiting the magnets in the circumferential direction are each angular and have a radially outer section 304 and a bevel 305 which extends at an angle thereto, the sections 304 and 305 having an angle of less than 60° with respect to one another, said angle being produced by virtue of pressing. A magnet foot 306 is provided in the transition between the bevel 305 and the radial inner side 307. The radially outer sections 304 on the two mutually opposite side faces of the permanent magnet 31 are parallel to one another.

The flux guidance element 300, whose cross-sectional geometry is matched to the side face geometry of the permanent magnet 31, adjoins one of the lateral limit faces 303. The flux guidance element 300 has a complementary geometry with respect to the side face 303 of the permanent magnet on the side facing the permanent magnet 31. Accordingly, the flux guidance element 300 is also angled, with the two angle sections being of approximately the same length. A gap 309, which acts as tolerance gap for compensating for manufacturing tolerances, in particular of the permanent magnet 31, is located in the contact region between the associated side faces of the permanent magnet 31 and the flux guidance element 300. The gap 309 does not extend over the entire axial length of the contact region; direct contact between the side face 303 of the permanent magnet and the flux guidance element 300 is provided adjacent to the radial inner side 307 and to the radial outer side 308 of the permanent magnet 31.

In order to hold the permanent magnet 31 and the associated flux guidance element 300 on the inner side of the pole housing 28, a fastening means in the form of a holding spring 301 is provided, said fastening means applying a holding force to the flux guidance element 300 in the circumferential direction. One limb of the holding spring 301 is supported on the inner side of the pole housing 28, and the other limb of the holding spring is in linear contact with an edge of the flux guidance element 300 and exerts a force on the flux guidance element 300 in a circumferential direction and with an additional component in the radial direction onto the pole housing. The holding spring 301 is in the form of a U, with only one limb 302 being illustrated for reasons of simplicity. The holding spring 301 is symmetrical to the axis 315, which extends in the radial direction. The holding spring is positioned in the pole housing via tabs (not illustrated).

The flux guidance element 300 and the permanent magnet 31 are coupled to one another in a form-fitting manner, when viewed in the radial direction, with the result that the holding of the flux guidance element 300 via the holding spring 301 is in principle sufficient for securing the permanent magnet 31 in its radial position on the inner side of the pole housing 28 as well. Owing to the angular embodiment of the side faces of the permanent magnet 31 and the flux guidance element 300, a form-fitting connection between these component parts is provided in the radial direction. In this case, the radially outer edge 310 of the permanent magnet 31 in relation to a radial 312 through the contact region between the permanent magnet and the flux guidance element is on the opposite side with respect to a central edge 313, which is formed at an angle between the two angular sections of the flux guidance element 300. In the same way, the radial inner edge 311 of the flux guidance element 300 is on the opposite side of the radial 312 with respect to the central edge 314 of the permanent magnet 31 on the side face 303. This ensures that the permanent magnet 31 and the flux guidance element 300 engage in one another in the circumferential direction and therefore a form-fitting connection is provided in the radial direction.

In the exemplary embodiment shown in FIG. 3, the two lateral sections 304 and 305 on the side face 303 of the permanent magnet 31 each have at least approximately the same length. In the exemplary embodiment shown in FIG. 4, on the other hand, the section 304 reaching as far as the radial outer side 308 is longer than the section 305 facing the radial inner side. The section 304 is at least twice as long as the section 305. As in the preceding exemplary embodiment, the sections 304 pointing radially outwards on the opposing side faces are parallel to one another.

In the exemplary embodiment shown in FIG. 5, the permanent magnet 31 is provided with a geometry which corresponds to that in FIG. 4. The flux guidance element 301, in contrast to the preceding exemplary embodiment, has a cross-sectional configuration which varies in the radial direction. On the side adjacent to the radial inner side 307, the flux guidance element 300 has a smaller extent in the circumferential direction than on the side facing the radial outer side 308.

A further difference with respect to the preceding exemplary embodiments consists in that a flat contact between the permanent magnets 31 and the flux guidance element 300 is provided on the section 304 which extends as far as the radial outer side 308. On the other hand, an air gap 309 is provided between the radially inner section 305 on the side face 303 and the facing side face on the flux guidance element 300.

In the exemplary embodiment shown in FIG. 6, the partially ground side faces 303 of the permanent magnet 31 are aligned radially and are provided with a cutout 316, into which a complementarily shaped projection 317 on the flux guidance element 300 protrudes. In the region of the projection 317, an air gap 309 can be formed toward the wall of the cutout 316.

The flux guidance element 300 has, on its wall side opposite the projection 317, a complementary cutout, which is produced by virtue of a metal sheet with a constant thickness, from which the flux guidance element is manufactured being provided with an embossed position in order to mold the projection 317. As illustrated by the dashed line 318, the flux guidance element 300 can also have a greater thickness in the circumferential direction, if appropriate. For large thicknesses, a cross section which increases as the diameter of the partial circle increases is advantageous.

As fastening means, a holding ring 319 is provided in FIG. 6 which is arranged on the radial inner side 307 and supports the permanent magnet 31 and the flux guidance element 300 radially. The flux guidance element 300 is placed against the magnet 31 by spring tongues (not illustrated) in the circumferential direction.

The invention claimed is:

1. An electric motor with permanent magnet excitation, comprising:
a stator, which has a pole housing (28) and permanent magnets (31) held on the pole housing (28), with flux guidance elements (300) being associated with said permanent magnets, fastening means for fastening the permanent magnets (31) and the flux guidance elements (300) being provided on the inside (307) of the pole housing (28),
characterized in that at least one permanent magnet (31) and one flux guidance element (300) are arranged so as to engage in one another in a form-fitting manner in such a way that, in a fitted state, a form-fitting connection is produced between the permanent magnet (31) and the flux guidance element (300) in a radial direction, and
characterized in that a radially outer edge (310) of the permanent magnet (31) and an edge (314) of the flux guidance element (300), said edge being offset radially inwards, lie on opposite sides of a radial (312) through the contact region between the permanent magnet (31) and the flux guidance element (300).

2. The electric motor as claimed in claim 1, characterized in that, in the fitted state, a form-fitting connection is produced between the permanent magnet (31) and the flux guidance element (300) in a circumferential direction as well.

3. The electric motor as claimed in claim 1, characterized in that a projection (317) extending in the circumferential direction on one of the permanent magnet and the flux guidance element protrudes into a complementary cutout (316) in the other of the permanent magnet and the flux guidance element.

4. The electric motor as claimed in claim 1, characterized in that the fastening means acts exclusively on the flux guidance element (300) and applies a holding force to said flux guidance element which secures the flux guidance element (300) on the pole housing (28).

5. The electric motor as claimed in claim 1, characterized in that the fastening means is in the form of a holding spring (301), which is held on the pole housing (28).

6. The electric motor as claimed in claim 5, characterized in that the holding spring (301) has a U shape, with a limb (302) of the holding spring (301) pressing in the circumferential direction against the flux guidance element (300) or the permanent magnet (31) and being supported on the pole housing (28).

7. The electric motor as claimed in claim 5, characterized in that a linear contact is provided between the holding spring (301) and the flux guidance element (300) or the permanent magnet (28).

8. The electric motor as claimed in claim 1, characterized in that the fastening means is in the form of an inner holding ring (319), which secures at least one of the flux guidance element (300) and the permanent magnet (31) on the pole housing (28) in the radial position.

9. The electric motor as claimed in claim 1, characterized in that there is a gap (309) between the flux guidance element (300) and the permanent magnet (31), said gap extending in the radial direction over a subregion of mutually facing side faces (303) of the flux guidance element (300) and the permanent magnet (31).

10. The electric motor as claimed in claim 1, characterized in that the flux guidance element (300) has an angular cross section.

11. The electric motor as claimed in claim 1, characterized in that the flux guidance element (300) has a constant cross section, when viewed in the radial direction over its length.

12. The electric motor as claimed in claim 1, characterized in that the flux guidance element (300) has a varying cross section, when viewed in the radial direction over its length.

13. The electric motor as claimed in claim 12, characterized in that a width of the flux guidance element (300) increases in the radial direction towards the pole housing (28).

14. A starting apparatus for an internal combustion engine with an electric motor as claimed in claim 1.

15. The electric motor as claimed in claim 1, characterized in that a radial inner side of the permanent magnets (31) is continuous such that it lacks a recess.

* * * * *